(12) United States Patent
Kim et al.

(10) Patent No.: US 7,312,583 B2
(45) Date of Patent: Dec. 25, 2007

(54) APPARATUS AND METHOD FOR DRIVING A LAMP UNIT, AND LIQUID CRYSTAL DISPLAY DEVICE USING THE SAME

(75) Inventors: Pu Jin Kim, Gyeongsangbuk-do (KR); Jae Ho Lee, Daegu (KR); Yong Kon Lee, Seoul (KR)

(73) Assignee: LG.Philips Co., Ltd., Seoul (KR)

( * ) Notice: Subject to any disclaimer, the term of this patent is extended or adjusted under 35 U.S.C. 154(b) by 0 days.

(21) Appl. No.: 11/168,325

(22) Filed: Jun. 29, 2005

(65) Prior Publication Data

US 2006/0087262 A1     Apr. 27, 2006

(30) Foreign Application Priority Data

Oct. 25, 2004   (KR)   .................... 10-2004-0085507

(51) Int. Cl.
*H05B 37/02*   (2006.01)
*G09G 3/36*   (2006.01)

(52) U.S. Cl. ................. 315/212; 315/224; 315/308; 345/102

(58) Field of Classification Search ............ 315/209 R, 315/212, 224–226, 246, 276, 283, 291, 307–308; 345/102
See application file for complete search history.

(56) References Cited

U.S. PATENT DOCUMENTS

| | | | | |
|---|---|---|---|---|
| 6,151,232 A | * | 11/2000 | Furuhashi et al. | 363/97 |
| 6,310,444 B1 | * | 10/2001 | Chang | 315/282 |
| 6,621,670 B2 | * | 9/2003 | Hayakawa et al. | 361/42 |
| 6,804,129 B2 | * | 10/2004 | Lin | 363/98 |
| 6,812,916 B2 | * | 11/2004 | Hwang | 345/102 |
| 6,927,989 B2 | * | 8/2005 | Fukumoto | 363/95 |
| 6,979,959 B2 | * | 12/2005 | Henry | 315/291 |
| 7,023,145 B2 | * | 4/2006 | Hwang et al. | 315/276 |
| 2004/0004596 A1 | * | 1/2004 | Kang et al. | 345/102 |
| 2004/0113631 A1 | * | 6/2004 | Hyeon-Yong | 324/510 |
| 2006/0120117 A1 | * | 6/2006 | Toda et al. | 363/24 |

* cited by examiner

*Primary Examiner*—Thuy Vinh Tran
(74) *Attorney, Agent, or Firm*—Morgan, Lewis & Bockius LLP

(57) ABSTRACT

An apparatus for driving a lamp comprising at least one lamp, an inverter to supply an alternating current signal, a transformer to boost the signal from the inverter and to supply the boosted signal to the lamp, and a safety circuit to detect the signal flowing to the lamp and to compare the signal with a predetermined threshold to shut down the inverter in accordance with the compared result.

11 Claims, 6 Drawing Sheets

APPARATUS AND METHOD FOR DRIVING A LAMP UNIT, AND LIQUID CRYSTAL DISPLAY DEVICE USING THE SAME

This application claims the benefit of Korean Patent Application No. P2004-85507 filed in Korea on Oct. 25, 2004, which is hereby incorporated by reference.

BACKGROUND OF THE INVENTION

1. Field of the Invention

The present invention relates to an apparatus and a method for driving a lamp unit, and a liquid crystal display device using the same, and more particularly, to an apparatus and a method for driving a lamp unit, and a liquid crystal display device using the same that has a safety circuit.

2. Description of the Related Art

In general, application of liquid crystal displays (hereinafter, "LCD") has been gradually widening due to their light weights, thin size, and low power consumption. In accordance with such a trend, LCDs are used in office automation devices, audio/video devices and the like. LCDs adjust transmittance quantity of light in accordance with an image signal applied to a matrix of a plurality of control switches to thereby display desired pictures on a screen.

Since LCDs are not light-emitting display devices, they need a back light unit as a light source. There are two types of back light units for the LCD, i.e., a direct-below-type and an edge-type depending on the arrangement of a lamp. Further, there are two types of lamps for the back light unit, i.e., a cold cathode fluorescent lamp (CCFL) and an external electrode fluorescent lamp (EEFL) in accordance with the shape of the lamp.

With regard to the arrangement of the lamp, in the edge type back light unit, a lamp is installed along the exterior periphery of a flat panel and a transparent light guide plate is used to thereby transfer the light from the lamp to an entire surface of a liquid crystal display panel. In the direct-below-type back light unit, several lamps are arranged in a plane parallel to a flat panel, and a diffusion panel is installed between the lamps and the liquid crystal display panel to uniformly distribute the light from the lamps to an entire surface of a liquid crystal display panel while fixedly keeping the distance between the liquid crystal display panel and the lamps.

With regard to the shape of the lamp, in the CCFL type, power is supplied to an electrode provided on both ends of a glass tube of the lamp. In the EEFL type, power is supplied to an electrode part in which a metal material is provided on both ends of a glass tube of the lamp.

FIG. 1 is a block diagram showing a related art lamp driver 60. As illustrated in FIG. 1, the lamp driver 60 connected to a plurality of lamps 36 includes an inverter 46 to receive DC voltage Vin from an external voltage source and to convert it into an AC signal, a transformer 48 to boost the AC signal generated from the inverter 46 and to apply the boosted AC signal to lamps 36, a feedback circuit 42 to detect a current supplied from the inverter 46 to lamps 36, and a controller (e.g., pulse width modulator PWM) 44 to control the inverter 46 in accordance with a feedback signal generated from the feedback circuit 42. The transformer 48 includes a primary winding wire 51 connected to the inverter 46, a secondary winding wire 53 synchronized to the primary winding wire 51 to generate an AC signal, and an auxiliary winding wire 52 arranged between the primary winding wire 51 and the secondary winding wire 53.

The lamp driver 60 having the above structure should comply with a safety standard in consideration for the safety of a user. The safety standard requires that a current flowing through a user when lamp driver 60 is contacted should be limited to a current (mA) less than 0.7 times that of the system operating frequency. When using a single lamp unit, the single lamp is manufactured in consideration of the above safety standard. For example, if a user contact with lamp driver 60 corresponds to an unloaded 2 kΩ, an equivalent resistance element of lamp 36 corresponds to about 200 kΩ, which is a common value. If the operating frequency is 65 kHz and the lamp 36 is normally operated, then a resonance characteristic of the secondary winding wire 53 suddenly changes when 2 kΩ is contacted with the secondary winding wire 53. Generally, the secondary winding wire 53 becomes a parallel resonance.

In parallel resonance, voltage gain of an input and an output changes in proportion to a resistance element of a load. In other words, the equivalent resistance element of the lamp 36 (200 kΩ) is connected to an unloaded resistance 59 of the user (2 kΩ in parallel. Therefore, the equivalent resistance shown from the secondary winding wire 53 is about 2 kΩ (200 kΩ∥2 kΩ). Accordingly, a load change of about 1/100 is generated, so that a gain change of about 1/100 is generated. Thus, the voltage of the secondary winding wire 53 is in compliance with the safety standard.

To quantitatively verify this, the current in compliance with the safety standard of a lamp using 65 kHz frequency is 46 mA(=0.7*65). Since the gain is 1/100, the voltage of the secondary winding wire 53 is about 15V(=1500*1/100). Therefore, the current passing through 2 kΩ becomes 7 mA in accordance with Ohm's law, thereby satisfying the safety standard (i.e., less than 46 mA).

However, in a case, for example, when ten lamps 36 are driven, for example, an equivalent resistance of the lamps 36 becomes 20 kΩ, if a user is connected to the system (i.e., if 2 kΩ, of the unloaded resistance 59 is connected to the system). The result is a gain of an output voltage becomes 1/10. Accordingly, the voltage of the secondary winding wire 53 becomes about 150V, so that the current flowing in the unloaded resistance 59 becomes about 70 mA. Thus, the safety standard is not satisfied.

SUMMARY OF THE INVENTION

Accordingly, the present invention is directed to an apparatus and method for driving a lamp unit, and liquid crystal display device using the same that substantially obviates one or more of the problems due to limitations and disadvantages of the related art.

An object of the present invention is to provide an apparatus and method for driving a lamp unit, and a liquid crystal display device using the same that complies with safety standards for the lamp units.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an apparatus for driving a lamp unit includes at least one lamp, an inverter to supply an alternating current signal, a transformer to boost the signal from the inverter and to supply the boosted signal to the lamp, and a safety circuit to detect the boosted signal flowing to the lamp and to compare the detected signal with a predetermined threshold to shut down the inverter based on the comparison.

In another aspect, a method for driving at least one lamp connected to an inverter to supply an alternating signal and a transformer to boost the signal from the inverter and to supply the boosted signal to the lamp includes detecting a signal flowing to the lamp, comparing the signal flowing to the lamp with a predetermined threshold, and shutting down the inverter based on the comparison.

In yet another aspect, a liquid crystal display device includes a liquid crystal display panel to display an image, at least one lamp to irradiate light to the liquid crystal display panel, an inverter to supply an alternating current signal, a transformer to boost the signal from the inverter and to supply the boosted signal to the lamp, and a safety circuit to detect the boosted signal flowing to the lamp and to compare the detected signal with a predetermined threshold to shut down the inverter based on the comparison.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENT

Figure 1:
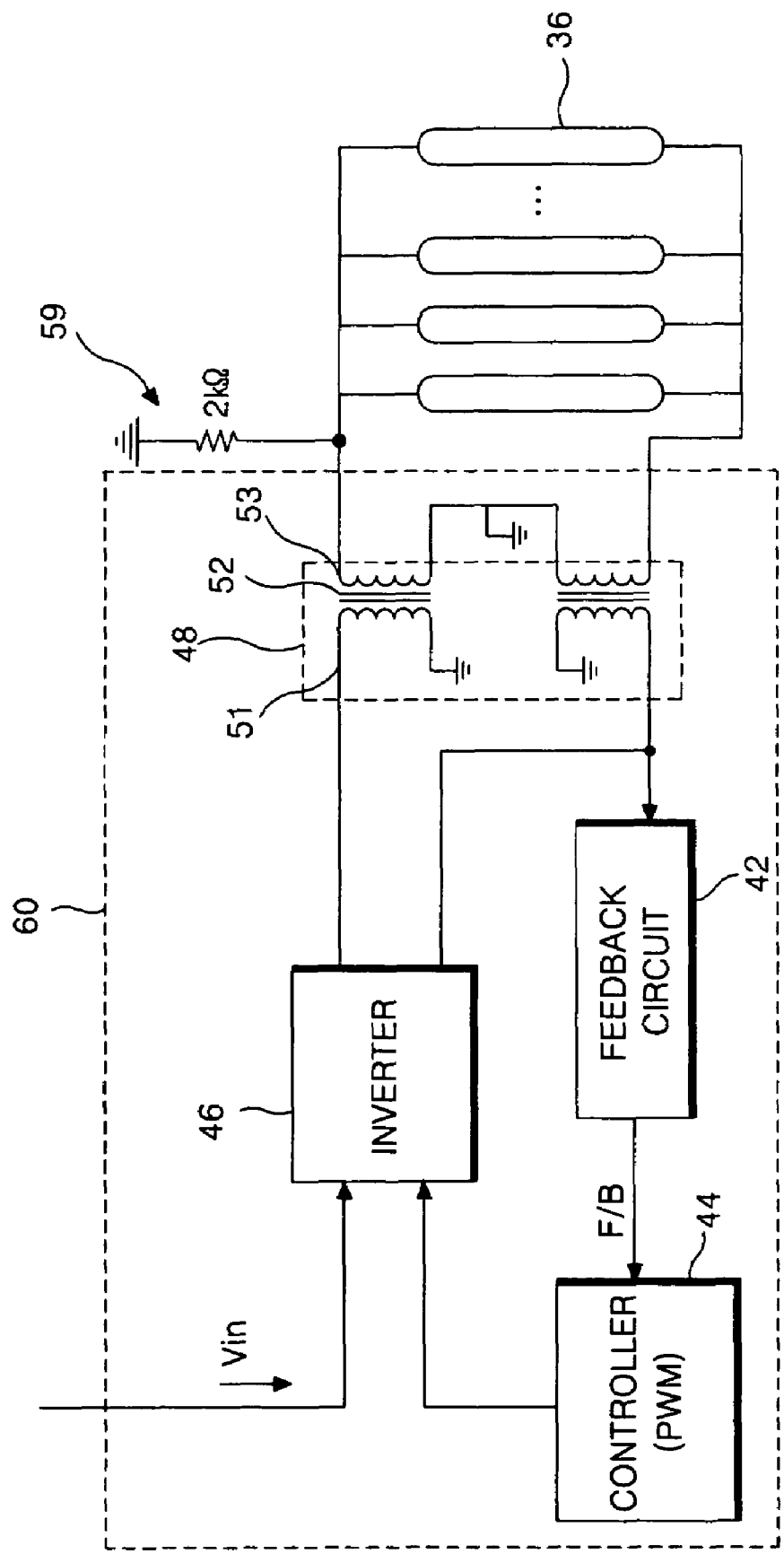
FIG. 1 is a block diagram showing a related art lamp driver.
Figure 2:
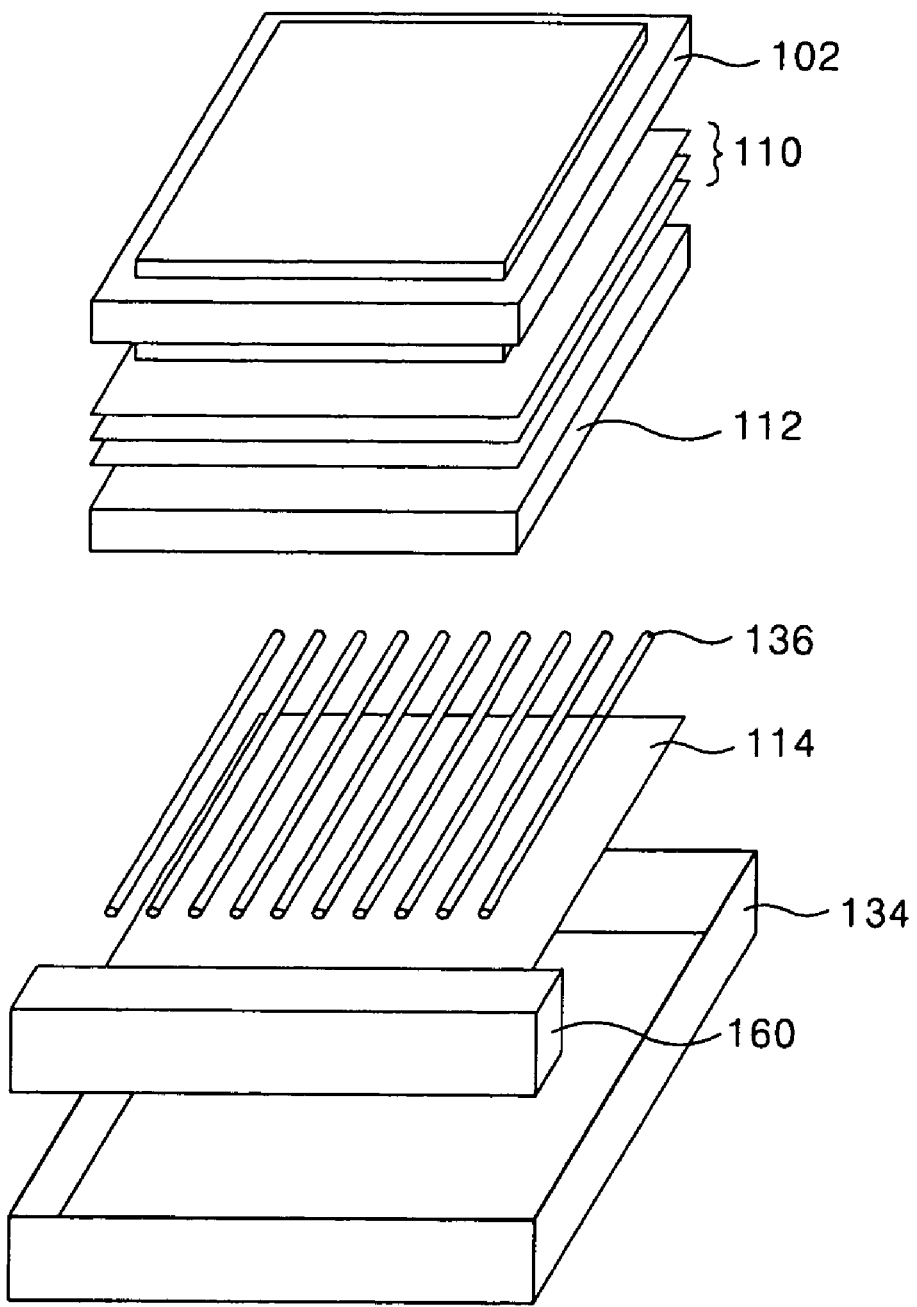
FIG. 2 is a perspective view illustrating a liquid crystal display device according to an exemplary embodiment of the present invention.

Hereinafter, the preferred exemplary embodiments of the present invention will be described in detail with reference to FIGS. 2 to 6. As shown in FIG. 2, the LCD device adopting a direct-below-type backlight includes a liquid crystal display panel 102 to display a picture, a backlight assembly including lamps 136 to irradiate uniform light onto the liquid crystal display panel 102, and a lamp driver 160 for driving the backlight assembly.

In the liquid crystal display panel 102, liquid crystal cells are arranged between an upper substrate and a lower substrate in an active matrix configuration. A common electrode and a plurality of pixel electrodes that apply an electric field to each of the liquid crystal cells are provided. Each of the pixel electrodes is connected to a thin film transistor that is used as a switch device. The pixel electrode along with the common electrode drives the liquid crystal cell in accordance with a data signal supplied through the thin film transistor, thereby displaying a picture corresponding to a video signal.

The backlight assembly includes a lamp housing 134, a reflection sheet 114 stacked on a front surface of the lamp housing 134, a plurality of lamps 136 located at an upper part of the reflection sheet 114, a diffusion plate 112, and optical sheets 110. The lamp housing 134 prevents leakage of light emitted from each of the lamps 136 and reflects the light emitted to the side and rear surfaces to the front surface, i.e., toward the diffusion plate 112, thereby improving the efficiency of the light generated by the lamps 136.

The reflection sheet 114 is arranged between the lamps 136 and the upper surface of the lamp housing 134 to reflect the light toward the liquid crystal display panel 102, thereby improving the efficiency of the back light assembly. The diffusion plate 112 evenly distributes the light emitted from the lamps 136 to the liquid crystal display panel. The diffusion plate 112 has a light diffusion member coated on both sides of the film composed of transparent resin. The optical sheets 110 narrow the viewing angle of the light coming out of the diffusion plate 112 to improve the front brightness of the liquid crystal display device, thus reducing power consumption.

Figure 3:
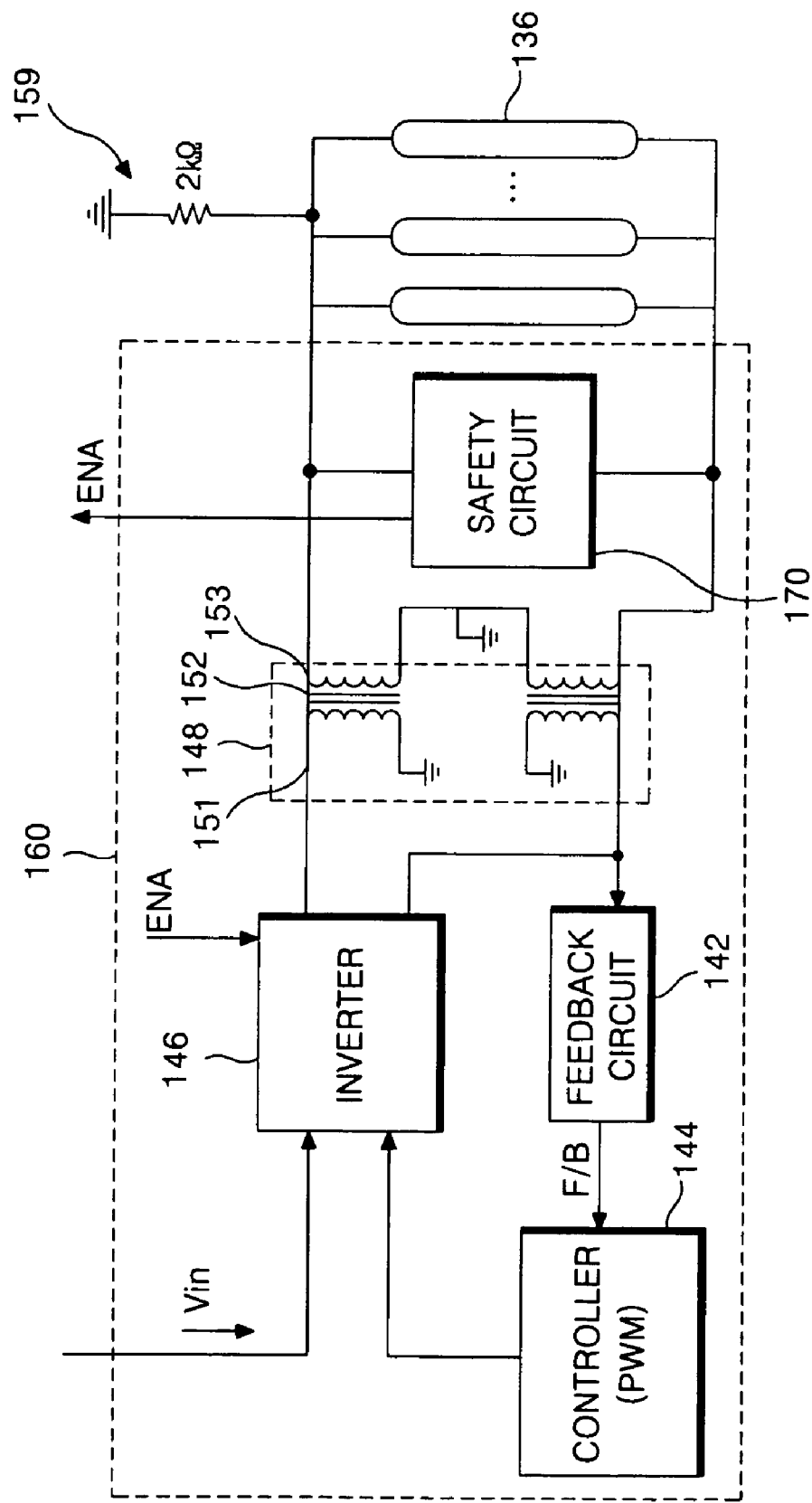
FIG. 3 is a block diagram showing a lamp driver of FIG. 2.

As shown in FIG. 3, the lamp driver 160, connected to a plurality of lamps 136 includes an inverter 146 to receive DC voltage Vin from an external voltage source and to convert it into an AC signal, a transformer 148 to boost the AC signal generated from the inverter 146 and to apply the boosted AC signal to the lamp 136, a feedback circuit 142 to detect a current supplied from the inverter 146 to the lamp 136, a controller (PWM) 144 to control the inverter 146 in accordance with a feedback signal F/B generated from the feedback circuit 142, and a safety circuit 170 to detect the current supplied from the inverter 146 to lamps 136 to intercept or maintain the current supplied to the lamps 136.

Each of the lamps 136 includes a glass tube, an inert gas inside the glass tube, and a cathode and an anode installed at both ends of the glass tube. The inside of the glass tube is charged with the inert gas, and the phosphorus is spread over the inner wall of the glass tube. Further, the cathode and the anode of each lamp 136 are integrated in the same polarity.

The inverter 146 receives a DC voltage from an external voltage source and uses a switch device included in the inverter circuit 146 to thereby convert the DC source voltage into an AC signal. Each of the transformers 148 includes a primary winding wire 151, a secondary winding wire 153 to generate an AC high voltage, and an auxiliary winding wire 152 arranged between the primary winding wire 151 and the secondary winding wire 153. The transformer 148 boosts the AC signal generated from the inverter 146 to supply the boosted AC signal to the lamps 136.

The feedback circuit 142 detects the AC high voltage from the inverter 146 supplied to the lamps 136 to generate a feedback voltage. The feedback circuit 142 may also be located at the output terminal of the lamps 136 to detect the value outputted from the lamps 136. The controller 144 receives the feedback voltage F/B generated from the feedback circuit 142 to control the switch device included in the inverter circuit 146. The safety circuit 170 detects the AC high voltage from the inverter 146 supplied to the lamps 136 to determine if it is within the safety standard and based on this determination to intercept or maintain with in the safety standard the current and voltage supplied to the lamps 136.

Figure 4:
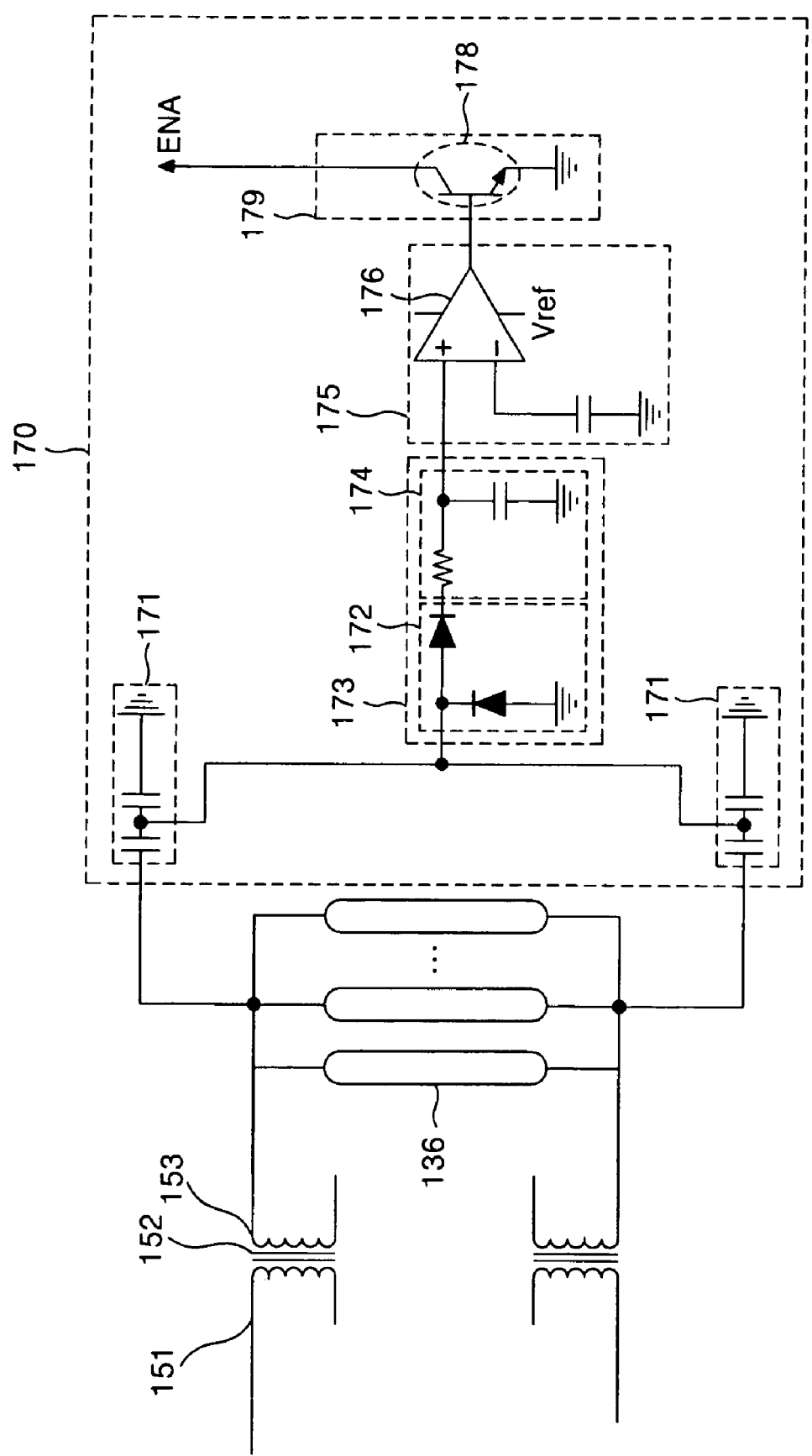
FIG. 4 is a detailed block diagram showing an exemplary safety circuit of FIG. 3.

A first exemplary embodiment of the safety circuit 170 connected to the lamps 136 of the liquid crystal display device according to the present invention will be described with reference to FIG. 4. As illustrated in FIG. 4, the first exemplary embodiment of the safety circuit 170 according to the present invention includes a detector 171 to detect a voltage at both ends of the lamps 136, a rectifier 173 to integrate the signals detected from the detector 171 to integrate into a DC level, a comparing part 175 to compare the rectified signal to a reference signal, and a switching part 179 connected to an output terminal of the comparing part 175 to turn on or turn off the inverter 146.

The detector 171 is connected to a secondary winding wire 153 connected to the lamps 136 to detect a voltage of the secondary winding wire 153. For instance, when polarities of both ends of the lamps 136 are different from each other and the same high voltage is applied to both ends of the lamps 136, the detector 171 detects respectively high voltages different from each other in the both ends of the lamps 136. In other words, the detector 171 is coupled to each end of the lamps 136.

The rectifier 173 combines the high voltages detected from the detector 171 into a signal. Thereafter, the rectifier 173 rectifies the signal in a half-wave by using a half-wave rectifier 172 having diodes coupled in parallel from each other, and again integrates the rectified half-wave signal into a DC level by using a low pass filter 174.

The comparing part 175 compares the signal passing through the rectifier 173 integrated into the DC level to a threshold or reference voltage Vref by using the comparator 176. At this time, if the signal is larger than the reference voltage Vref, the comparing part 175 turns on an output voltage. On the other hand, if the signal is smaller than the reference voltage Vref, the comparing part 175 turns off the output voltage. The reference voltage Vref is determined based on experimentally measured characteristics of each lamp 136, a use frequency, and a voltage applied to the lamps 136 within a safety standard.

When the output voltage of the comparing part 175 does not exist (i.e., when the voltage from the comparing part 175 is smaller than the reference voltage Vref), the switching part 179 maintains the switch 178 in a turn-off state. Accordingly, the switching part 179 maintains the inverter 146 of the lamp driver 160 in a high state, so that the lamp driver 160 remains in an enabled state. On the other hand, when the output voltage is present (i.e., when the voltage from the comparing part 175 is larger than the reference voltage Vref), the switching part 179 turns-on the switch 178 to ground the inverter 146, thereby intercepting power to the lamp driver 160.

A method for driving a lamp of a liquid crystal display device having the above structure according to an embodiment of the present invention will be described as follows. During normal operations (i.e., a user does not come in contact with the lamp driver 160), polarities at each ends of the lamps 163 are different from each other and signals having the same amplitude are applied to both ends of the lamps 163. The two signals detected from the detector 171 are combined and passed through the rectifier 173. The two signals cancel each other to become a zero level signal. Accordingly, the output voltage of the comparing part 175 remains turned-off, which in turn keeps the switch 178 of the switching part 179 turned-off to maintain an enabled state of the lamp driver 160.

When a user comes in contacted with the lamp driver 160 (i.e., an unloaded resistance 159 of 2 kΩ is connected with one side of the secondary winding wire 153), an output voltage of one side of the secondary winding wire 153 reduces by about 1/10 and a voltage of the other side of the other secondary winding wire 153 increases. Accordingly, signals not canceled off from each other remain as output signals of the detector 171. The remaining signals pass through the rectifier 173 to be outputted as a fixed level voltage. The fixed level voltage is compared to a reference voltage set at a safety threshold. At this time, if the fixed level voltage is larger than the reference voltage, the comparing part 175 is turned on, which in turn turns on the switch 178. Accordingly, the inverter 146 of the lamp driver 160, which connected to the collector of the switch 178, is grounded to a low state, thereby shutting down the lamp driver 160.

Figure 5:
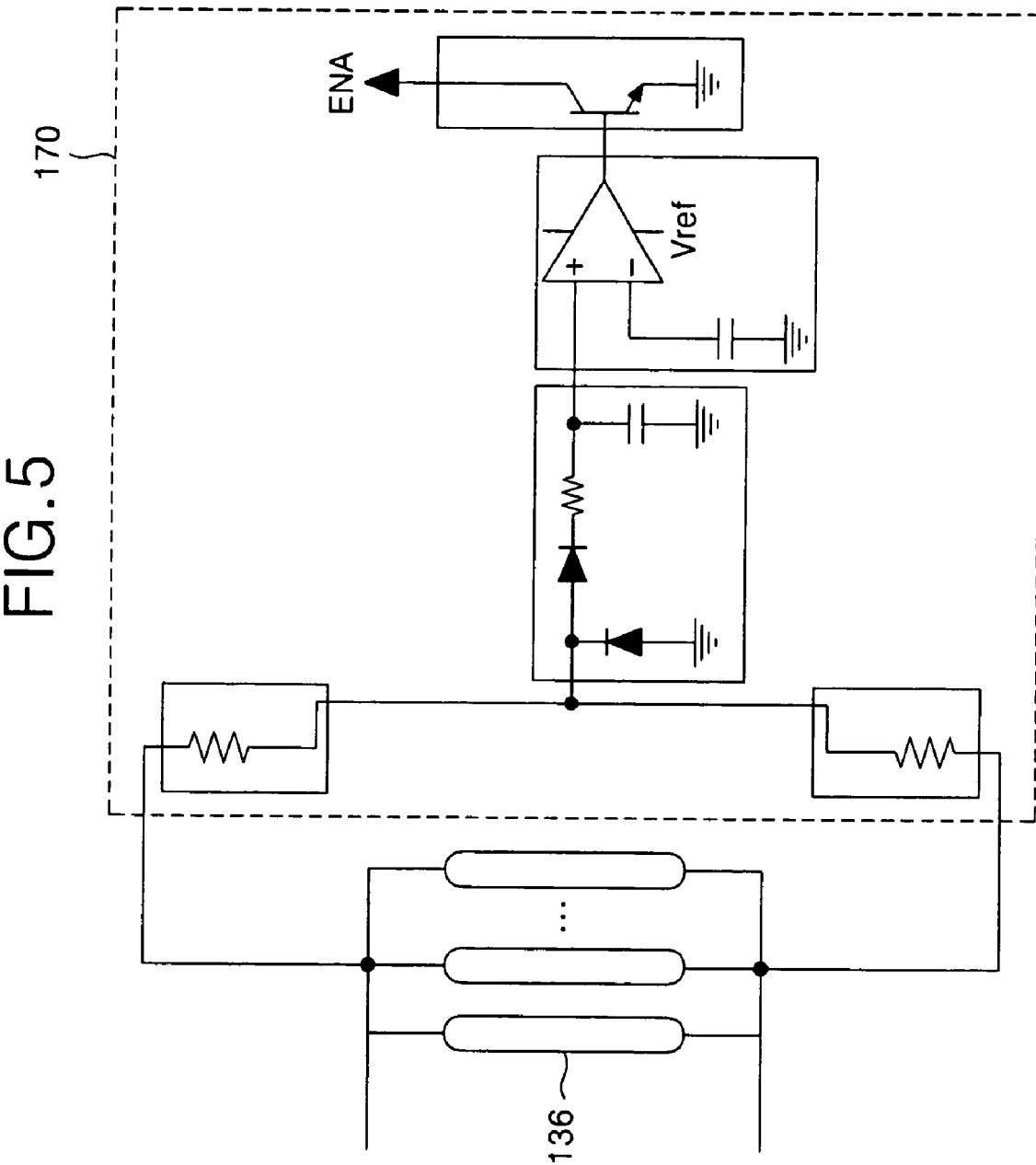
FIG. 5 is a block diagram showing another exemplary safety circuit of FIG. 3.

Even through the exemplary embodiment of the present invention was described in accordance with the user corresponding to an unloaded resistance 159 of 2 kΩ, the equivalent resistance of the lamps 136 corresponding to 200 kΩ and the number of lamps 136 being 10, the present invention is not so limited. Further, in a second exemplary embodiment of the safety circuit 170 according to the present invention, resistors are used to detect the current flowing at both ends of the lamp 136 as shown in FIG. 5. In addition, the apparatus for driving the lamp according to the exemplary embodiments of the present invention can be applied to any shape of the lamp, such as the CCFL type and the EEFL type. More specifically, one side of the signal supplied to the both ends of the lamp may be grounded and the reference voltage Vref of the comparing part 175 may be changed irrespective of whether a high voltage signal is supplied to one side, so that a voltage or a current change of the lamp driver 160 can be detected. The detected change is then compared to a reference value to either shut down or operate the lamp driver 160.

Figure 6:
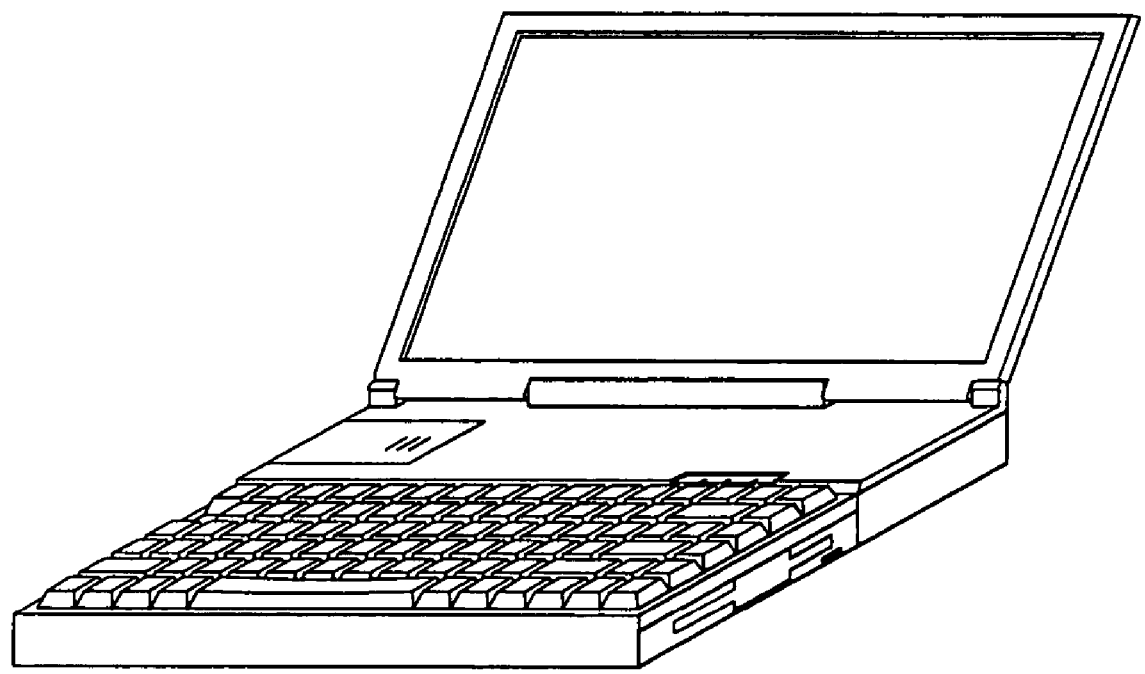
FIG. 6 is a configuration showing a notebook computer including the exemplary lamp drivers according to the embodiment of the present invention.

The apparatus for driving the lamp according to the exemplary embodiments of the present invention can be applied in various industrial fields such as portable information equipment, general information equipment, and office information equipment like the notebook computer as shown in FIG. 6. As describe above, it is possible to achieve a level of safety according to a safety standard for the lamp drivers using the apparatus and method of the present invention irrespective of the number of lamps. One only needs to change reference voltage in order to meet the safety standard where a plurality of the lamps is used. Accordingly, it is possible to apply the apparatus and method of the present invention to various kinds and numbers of lamps.

It will be apparent to those skilled in the art that various modifications and variations can be made in the apparatus and a method for driving a lamp unit, and a liquid crystal display device using the same of the present invention without departing from the spirit or scope of the invention. Thus, it is intended that the present invention cover the modifications and variations of this invention provided they come within the scope of the appended claims and their equivalents.

What is claimed is:

1. An apparatus for driving a lamp unit, comprising:
   at least one lamp;
   an inverter to supply an alternating current signal;
   a transformer to boost the signal from the inverter and to supply the boosted signal to the lamp, wherein the transformer includes
      a primary winding wire connected to the inverter to generate the alternating current signal,
      a secondary winding wire induced by the primary winding wire to amplify the alternating current signal, and an auxiliary winding wire arranged between the primary winding wire and the secondary winding wire; and a safety circuit to detect the boosted signal flowing to the lamp and to compare the detected signal with a predetermined threshold to shut down the inverter based on the comparison, wherein the safety circuit includes
a detector to detect the boosted signal,
a rectifier to rectify the detected signal from the detector into a direct current level,
a comparing part to compare the rectified signal from the rectifier with the predetermined threshold, and
a switching part to switch the apparatus between a shut down state and an operating state in response to the resulting signal from the comparing part,
wherein the detector is connected between the secondary winding wire and the lamp to detect the amplified signal and the detected signal is a current.

2. The apparatus according to claim 1, wherein the rectifier includes:
a half-wave rectifier having diodes coupled in parallel with each other and connected to the detector; and
an integrating circuit to integrate a signal from the half-wave rectifier to supply the integrated signal to the comparing part.

3. The apparatus according to claim 1, wherein the switching part includes a transistor having:
a base terminal connected to an output terminal of the comparing part;
a collector terminal connected to the inverter; and
an emitter terminal connected to ground.

4. A method for driving at least one lamp connected to an inverter to supply an alternating signal and a transformer to boost the signal from the inverter and to supply the boosted signal to the lamp, comprising:
detecting a signal flowing to the lamp;
comparing the detected signal flowing to the lamp with a predetermined threshold, wherein the detected signal is a current; and
shutting down the inverter based on the comparison,
wherein the transformer includes a primary winding wire connected to the inverter to generate the alternating current signal, a secondary winding wire induced by the primary winding wire to amply the alternating current signal, and an auxiliary winding wire arranged between the primary winding wire and the secondary winding wire.

5. The method according to claim 4, further comprising rectifying the detected signal into a direct current level, wherein the comparing step includes comparing the rectified signal with the predetermined threshold, and the shutting down step includes switching the inverter between one of a shut down state and an operating state in response to the comparing step.

6. The apparatus according to claim 5, wherein the rectifying step includes:
passing the detected signal through a half-wave rectifier having diodes coupled in parallel with each other; and
integrating the half-wave rectified signal to compare with the predetermined threshold.

7. A liquid crystal display device, comprising:
a liquid crystal display panel to display an image;
at least one lamp to irradiate light to the liquid crystal display panel;
an inverter to supply an alternating current signal;
a transformer to boost the signal from the inverter and to supply the boosted signal to the lamp, wherein the transformer includes
a primary winding wire connected to the inverter to generate the alternating current signal,
a secondary winding wire induced by the primary winding wire to amplify the alternating current signal, and
an auxiliary winding wire arranged between the primary winding wire and the secondary winding wire; and a safety circuit to detect the boosted signal flowing to the lamp and to compare the detected signal with a predetermined threshold to shut down the inverter based on the comparison, wherein the safety circuit includes
a detector to detect the boosted signal,
a rectifier to rectify the detected signal from the detector into a direct current level,
a comparing part to compare the rectified signal from the rectifier to the predetermined threshold, and
a switching part to switch the apparatus between a shut down state and an operating state in response to the resulting signal from the comparing part,
wherein the detector is connected between the secondary winding wire and the lamp to detect the amplified signal.

8. The liquid crystal display device according to claim 7, wherein the rectifier includes:
a half-wave rectifier having diodes coupled in parallel with each other and connected to the detector; and
an integrating circuit to integrate a signal from the half-wave rectifier to supply the integrated signal to the comparing part.

9. The liquid crystal display device according to claim 7, wherein the switching part includes a transistor having:
a base terminal connected to an output terminal of the comparing part;
a collector terminal connected to the inverter; and
an emitter terminal connected to ground.

10. An apparatus for driving a lamp unit, comprising:
at least one lamp;
an inverter to supply an alternating current signal;
a transformer to boost the signal from the inverter and to supply the boosted signal to the lamp, wherein the transformer includes
a primary winding wire connected to the inverter to generate the alternating current signal,
a secondary winding wire induced by the primary winding wire to amplify the alternating current signal, and
an auxiliary winding wire arranged between the primary winding wire and the secondary winding wire; and a safety circuit to detect the boosted signal flowing to the lamp and to compare the detected signal with a predetermined threshold to shut down the inverter based on the comparison, wherein the detected signal is a voltage, the safety circuit including
a detector to detect the boosted signal, wherein the detector is connected between the secondary winding wire and the lamp to detect the amplified signal,
a rectifier to rectify the detected signal from the detector into a direct current level,
a comparing part to compare the rectified signal from the rectifier to the predetermined threshold, and
a switching part to switch the apparatus between a shut down state and an operating state in response to the resulting signal from the comparing part, the switching part including a transistor having a base terminal connected to an output terminal of the comparing part, a collector terminal connected to the inverter, and an emitter terminal connected to ground.

11. The apparatus according to claim 10, wherein the rectifier includes:

a half-wave rectifier having diodes coupled in parallel with each other and connected to the detector; and an integrating circuit to integrate a signal from the half-wave rectifier to supply the integrated signal to the comparing part.

* * * * *